Figure 1:
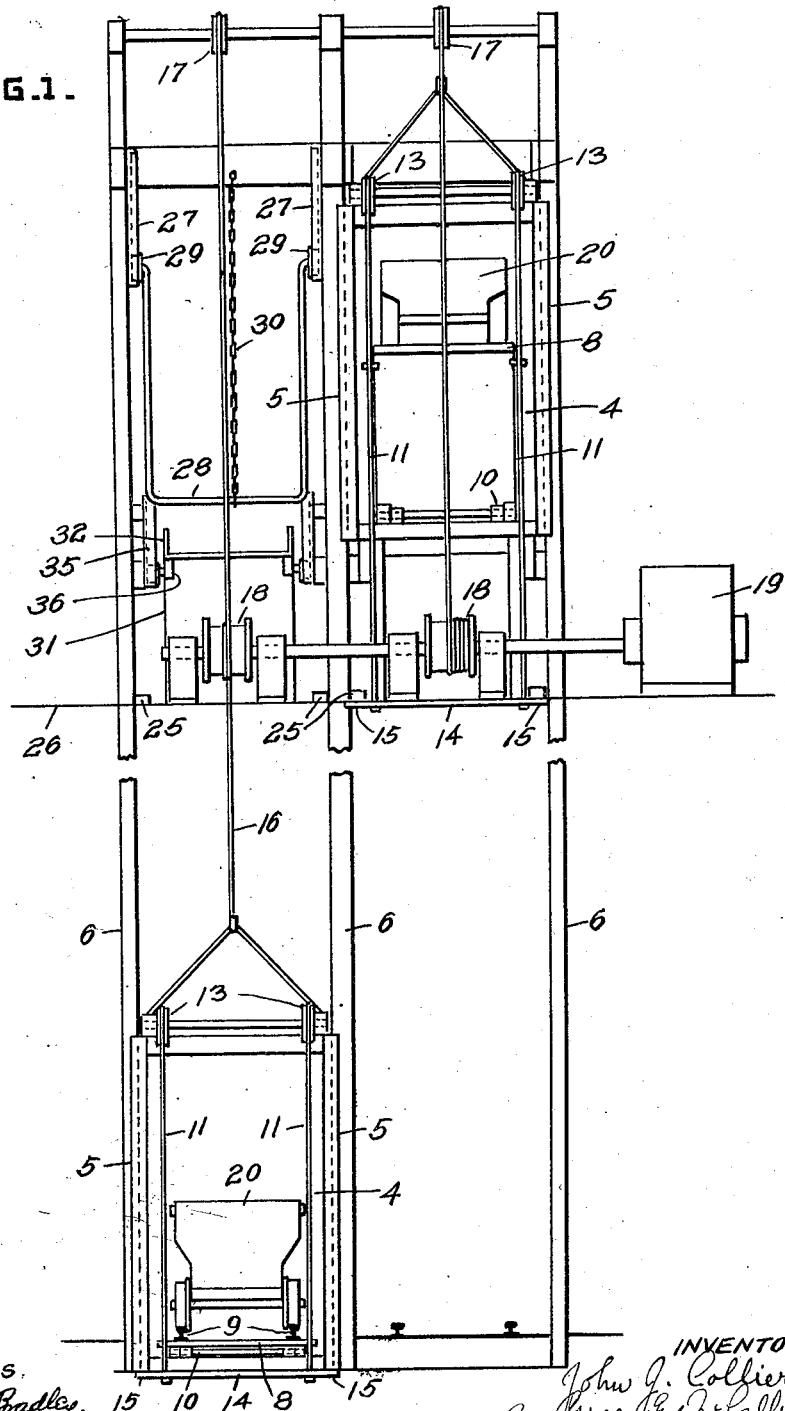

June 4, 1929.    J. J. COLLIER    1,716,030
SELF DUMPING MINE CAGE
Filed Jan. 21, 1925    3 Sheets-Sheet 2
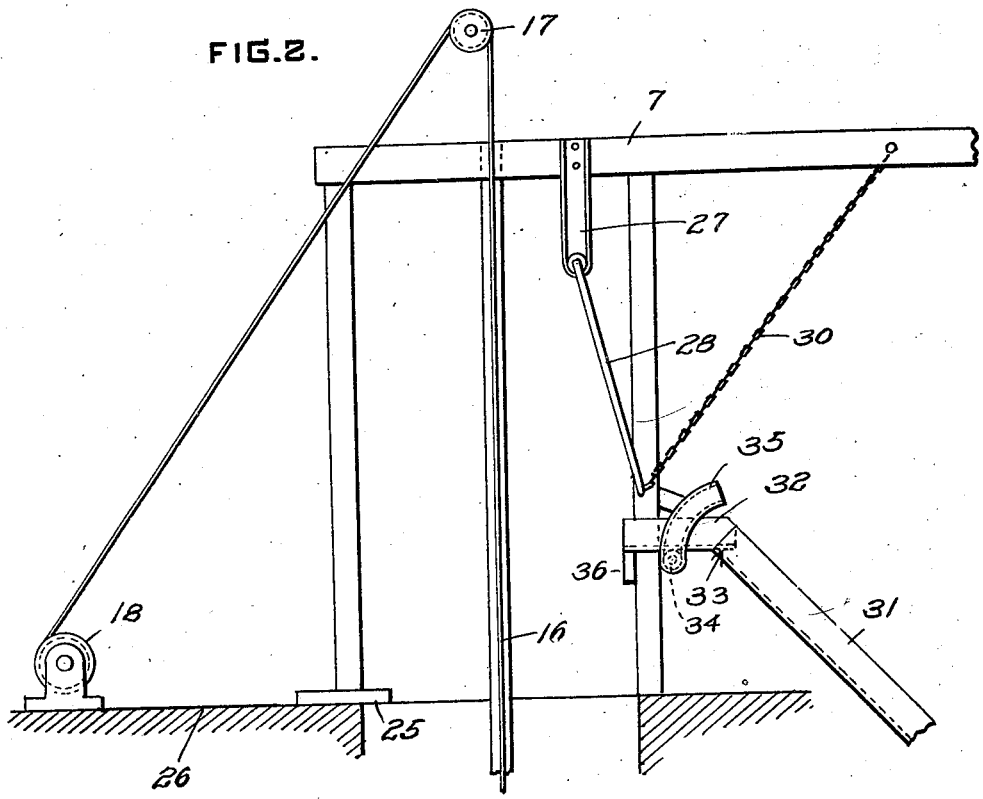
FIG.2.
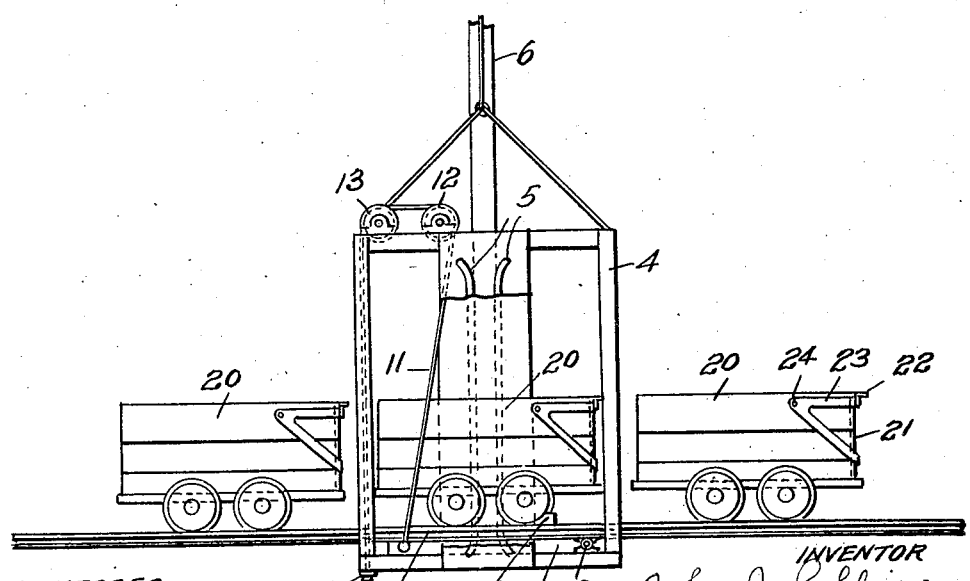

Patented June 4, 1929.

1,716,030

UNITED STATES PATENT OFFICE.

JOHN J. COLLIER, OF IRWIN, PENNSYLVANIA.

SELF-DUMPING MINE CAGE.

Application filed January 21, 1925. Serial No. 3,715.

This invention relates to self dumping cages and cars for shaft mines and one object of this invention is to produce a simple, rugged, self-dumping cage and car for shaft mines.

An object of this invention is to produce a cage for shaft mines and mechanism for operating the cage in a manner such that the car carried thereby (as the cage approaches the top of the tipple) will be tilted on end, have its end door opened and will dump its load into a chute which is automatically raised so as to have the same inclination as the car floor; the mechanism being constructed so that after the car is dumped the end door will be closed and the car returned to horizontal position as the cage carrying the car descends into the mine shaft.

Those as well as other objects which will readily appear to those skilled in this particular art I attain by means of the apparatus described in the specification and illustrated in the drawings accompanying and forming part of this application.

Figure 3:
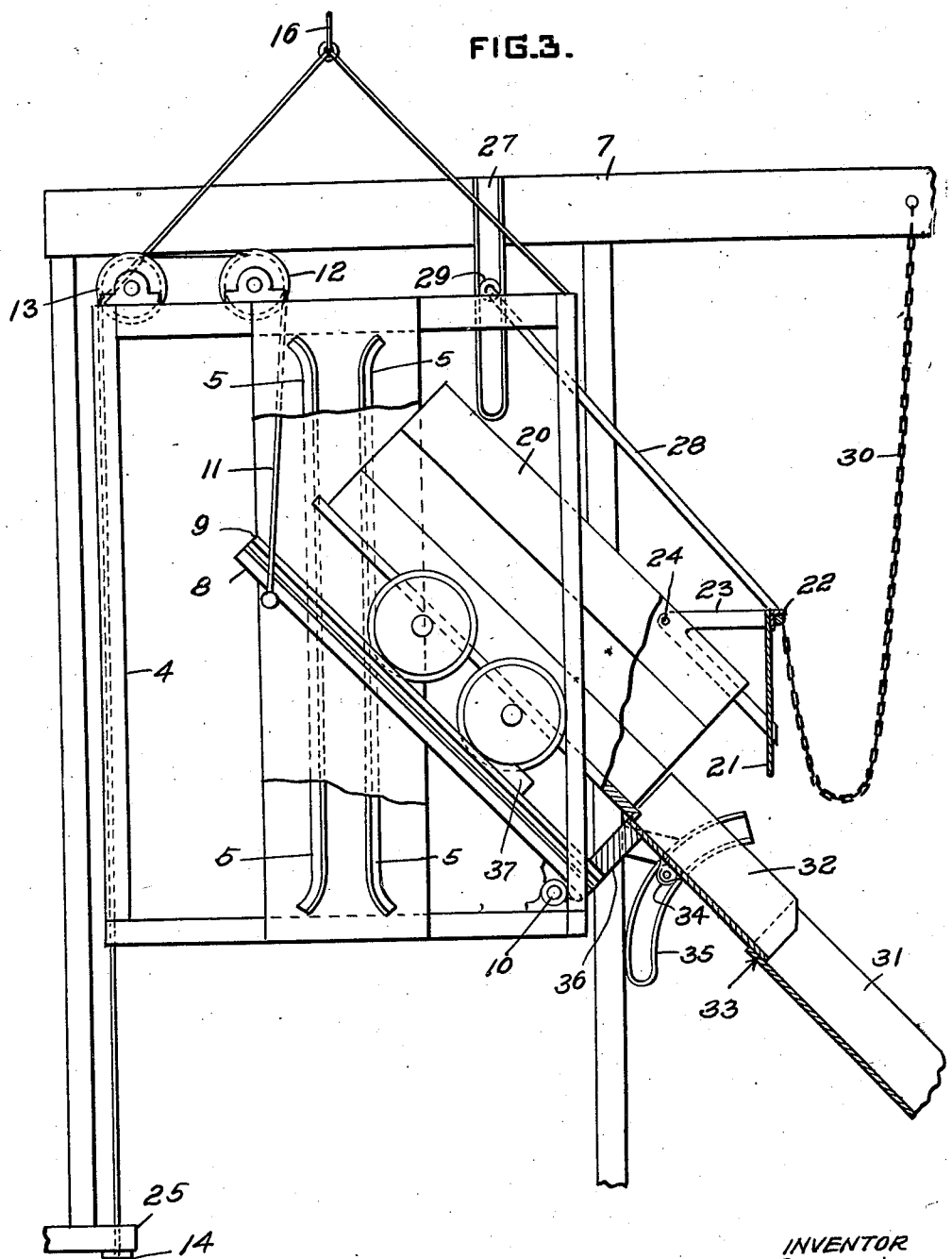

In the drawings, Figure 1 is a view in elevation representing a mine shaft with two cages operating therein. The view illustrates the cage guides, the surface line, the hoisting engine and the drums to which the cage cables are attached. Fig. 2 is a view in elevation turned 90 degrees from Fig. 1 and shows one of the cages. In this view three cars are shown at the bottom of the mine, one in the cage, one approaching the cage and one leaving the cage. All of the mechanism for rendering the apparatus automatic is illustrated in this view. Fig. 3 is an enlarged view in side elevation of a cage and car embodying this invention.

In the drawings the invention is shown applied to a shaft mine but it will be understood that it is applicable wherever it is desired to hoist and automatically dump material capable of being carried in cars having a swinging end door.

The cage 4 may be of any desired construction and in the drawings is shown as consisting of a rectangular framework provided with shoes 5 which co-operate with guides or rails 6 which extend from the bottom of the mine shaft to the top of the tipple structure 7. The cage is provided with a floor or platform 8 to which rails 9 are attached. The platform is hingedly connected to the bottom structure of the cage at 10 so that it is capable of swinging upwardly around its pivot point. A pair of cables 11, one for each side of the cage, are connected to the end of the platform 8 opposite to the pivot point 10. These cables pass over sheaves 12 and 13 carried on the top of the cage and extend downwardly to a cross-member 14 which extends from side to side of the cage and which serving as an abutment member as shown at 15—15 Fig. 1.

Each cage (there being two as illustrated in Fig. 1) is provided with a cable 16 which is suitably attached thereto and which, passing over a bull-wheel 17 is connected to a winding drum 18 on the shaft of a hoisting engine 19.

The cables 16 are wound in opposite directions on drums 18 so that as one cage ascends the other will descend. In this manner the cages and cars carried thereby are balanced.

Each of the mine cars 20 adapted for operation with this apparatus is provided with one swinging end door 21. The end door is provided with a projection at its top formed in the nature of an angle iron 22. This extends across the top of the door from side to side. Each door is connected to the body of the car or rather to the sides thereof by means of support frames 23. Each support frame is pivotally connected to the sides of the car at 24. From this construction it will be seen that the door in opening and closing will swing about pivots 24 as shown in Fig. 3.

Located at a suitable point below the top of the tipple structure is a stop member 25 which projects a slight distance into the mine shaft in line with the extended ends 15 of cross members 14. In the drawings these stop members are shown located at the ground level 26.

Secured to the tipple on opposite sides of the cage space I provide two depending U-shaped straps 27 and within these an actuator member 28 is mounted. The actuator member as shown in Fig. 1 consists of a rod bent into a more or less U-shape and at its two upper ends is provided with rollers 29 which are preferably flanged so as to be retained within U-straps 27. The lower free end of the actuator member 28 is held out of the path of travel of the cage, or rather the car carried thereby, by means of a cable or chain 30 which is secured to some suitable part of the tipple structure.

A chute 31 for leading the dumped material to the point desired forms a part of the tipple structure and its upper end 32 is formed so as to be capable of swinging about point 33. This end 32 is carried upon rollers 34 which operate within curved ways 35. End 32 of the chute is provided with a depending abutment member 36. Means are provided for locking the mine cars in position on the rails 9 of the pivoted platform 8 of each cage. This means may consist of suitable blocks 37 which may be secured in place by the operator at the bottom of the mine shaft or any of the well-known car locking devices may be utilized.

In operation, assuming that one cage is descending with an empty car and that the other cage is ascending with a loaded car, it will be apparent that the cages and cars will be balanced, except for the load in the ascending car and that the load on the hoisting engine will merely be the load in the ascending car.

When the ascending car reaches the position at which stops 25 contact with the projecting ends 15 of cross bar 14 the free end of the pivoted platform 8 of the car will begin to be raised ahead of the cage and this will continue until the cage reaches the top limit of its travel.

As the forward or pivot end of the tilting platform (during upward travel of the cage) contacts with abutment member 36 depending from the inner end 32 of the chute this inner end will be raised about its pivot point until it assumes the position shown in Fig. 3 where it is on a line with the remainder of the chute and directly below the floor of the mine car.

Simultaneously with this operation which also occurs simultaneously with the tilting of the car, the end door of the car will be opened to the position shown in Fig. 3. This is accomplished by actuator 28 which hooks under angle 22 on the upper part of the car door as the car is tilted. The actuator upon connecting with the angle 22 is forced upwardly in straps 27 and holds the door against movement as the car is tilted, thereby allowing the load to slide or avalanche from the car into the chute.

After dumping, the hoisting engine will be reversed so that the empty cage will descend and the cage with the full car will ascend. As the cage descends, the tilting platform, the pivoted end of the chute and the swinging car door will assume their normal positions. When the empty cage, or rather the cage with the empty car, reaches the bottom of the shaft blocks 37 will be removed and a full car will push the empty car off the cage and will itself take its position in the cage and will be locked therein by the operator.

It will be seen that by positioning stop 25 and actuator 28 at any suitable points in the upward travel of the cages, the load in the ascending car may be automatically dumped wherever desired. This feature is particularly valuable where it is desired to dump rock or other material on the ground below the tipple.

It will be seen that the cages are at all times, even during the dumping operation, supported by their cables and therefore the cages except for the load in the ascending car are at all times balanced. This materially reduces the starting torque of the hoisting engine over that of the devices now on the market with which I am familiar, since the only unbalanced load and therefore the only load on the hoisting engine is the weight of the load in the ascending car.

Having thus described my invention, what I claim as new and useful and desire to secure by Letters Patent is:—

1. The combination with a mine car cage, its ways, cables and cable winding means, of a car support within the cage and pivotally connected thereto along one of its edges with its opposite edge free, a pair of cables connected to the free edge of the support, a pair of sheaves in the upper part of the cage and over which said cables extend, an abutment member connecting the free ends of said cables and a stop for contacting with and holding said abutment member during upward travel of the cage past a certain point whereby the free edge of the platform is raised to dumping position.

2. The combination with a mine car cage, its ways, cables and cable winding means, of a car support within the cage and pivotally connected thereto at one of its ends with its opposite end free, means connected to the cage and car support for raising the free end of said support at a predetermined point in the upward travel of said cage, a chute having a pivoted upper end and adapted to be moved to a position substantially parallel to the car support by the car support during the upward movement of its free end.

3. The combination with a mine car cage, its ways, cables and cable winding means, of a car supporting platform with the cage and pivotally connected thereto along one of its edges with its opposite edge free, means associated with the cage and car supporting platform for raising the free edges of the said platform at a predetermined point in the upward travel of the cage, a chute having a pivoted upper end and means associated therewith for engaging the pivoted edge of the platform whereby the pivoted end of the chute is moved to a position substantially parallel to the remaining portion of the chute and the supporting platform when the latter's free end is raised to its uppermost position.

In testimony whereof, I have hereunto subscribed my name this 5th day of January, 1925.

J. J. COLLIER.